(12) United States Patent
Wemmenhove et al.

(10) Patent No.: US 10,712,464 B2
(45) Date of Patent: Jul. 14, 2020

(54) WIDE SOURCE SEISMIC TOWING CONFIGURATION

(71) Applicant: REFLECTION MARINE NORGE AS, Laksevag (NO)

(72) Inventors: Rik Wemmenhove, Asker (NO); Nicolas Barral, Asker (NO); Martin Howlid, Asker (NO); Emmanuel Coste, Houston, TX (US)

(*) Notice: Subject to any disclaimer, the term of this patent is extended or adjusted under 35 U.S.C. 154(b) by 46 days.

(21) Appl. No.: 15/110,136

(22) PCT Filed: Jan. 9, 2015

(86) PCT No.: PCT/US2015/010719
§ 371 (c)(1),
(2) Date: Jul. 7, 2016

(87) PCT Pub. No.: WO2015/147965
PCT Pub. Date: Oct. 1, 2015

(65) Prior Publication Data
US 2016/0327674 A1   Nov. 10, 2016

Related U.S. Application Data

(60) Provisional application No. 61/925,519, filed on Jan. 9, 2014, provisional application No. 62/018,215, filed on Jun. 27, 2014.

(51) Int. Cl.
*G01V 1/38* (2006.01)

(52) U.S. Cl.
CPC .............. *G01V 1/3817* (2013.01); *G01V 1/38* (2013.01); *G01V 1/3808* (2013.01)

(58) Field of Classification Search
CPC ........ G01V 1/3808; G01V 1/38; G01V 1/3817
(Continued)

(56) References Cited

U.S. PATENT DOCUMENTS 5,717,655 A    2/1998  Beasley
5,835,450 A *  11/1998 Russell ............... G01V 1/3808
                                                       367/20
(Continued)

FOREIGN PATENT DOCUMENTS

CN    103018769 A    4/2013
EP     2223595 A2    9/2010
(Continued)

OTHER PUBLICATIONS

Extended Search Report for the equivalent European patent application 15768582.7 dated Oct. 10, 2017.
(Continued)

*Primary Examiner* — Ian J Lobo (57) ABSTRACT

Various implementations described herein are directed to a method of acquiring seismic data. The method may include towing an array of marine seismic streamers coupled to a vessel. The array comprises a plurality of lead-in cables and streamers, and the plurality of lead-in cables comprises an innermost lead-in cable and an outermost lead-in cable with respect to a center line of the vessel. The method may also include towing a plurality of source cables and one or more seismic sources such that the one or more seismic sources are positioned between the innermost lead-in cable and the outermost lead-in cable.

21 Claims, 4 Drawing Sheets

(58) Field of Classification Search
USPC .................................................. 367/15, 20
See application file for complete search history.

(56) References Cited

U.S. PATENT DOCUMENTS

| | | | | |
|---|---|---|---|---|
| 6,498,768 | B1* | 12/2002 | Gjestrum | G01V 1/201 367/16 |
| 7,881,152 | B2 | 2/2011 | Storteig et al. | |
| 9,733,376 | B2* | 8/2017 | Landais | G01V 1/3808 |
| 9,746,570 | B2* | 8/2017 | Mensch | G01V 1/3808 |
| 2004/0013037 | A1* | 1/2004 | Vaage | G01V 1/006 367/21 |
| 2004/0060498 | A1* | 4/2004 | Petersen | G01V 1/3826 114/253 |
| 2007/0064526 | A1 | 3/2007 | Holo | |
| 2007/0159921 | A1* | 7/2007 | Regone | G01V 1/3808 367/15 |
| 2008/0279042 | A1 | 11/2008 | Storteig et al. | |
| 2010/0212927 | A1 | 8/2010 | Harrick | |
| 2011/0199857 | A1 | 8/2011 | Garden | |
| 2011/0299360 | A1* | 12/2011 | Lansley | G01V 1/3861 367/20 |
| 2012/0257474 | A1* | 10/2012 | Cambois | G01V 1/3808 367/16 |
| 2013/0070557 | A1* | 3/2013 | Tonchia | G01V 1/3861 367/16 |
| 2013/0070559 | A1 | 3/2013 | Barker | |
| 2013/0238249 | A1 | 9/2013 | Xu et al. | |

FOREIGN PATENT DOCUMENTS

| | | |
|---|---|---|
| GB | 2424482 A | 9/2006 |
| GB | 2497204 A | 6/2013 |

OTHER PUBLICATIONS

Office Action for the equivalent Chinese patent application 201580004056.7 dated May 25, 2017 (without English translation).
International Search Report and Written Opinion issued in the related PCT Application PCT/US2015/010719 dated Sep. 23, 2015 (14 pages).
International Preliminary Report on Patentability issued in related PCT application PCT/US2015/010719 dated Jul. 21, 2016, 12 pages.
Office Action for the equivalent Chinese patent application 201580004056.7 dated Apr. 26, 2018.

* cited by examiner

WIDE SOURCE SEISMIC TOWING CONFIGURATION

CROSS-REFERENCE TO RELATED APPLICATIONS

This application claims the benefit of U.S. Provisional Patent Application Ser. No. 62/018,215, filed Jun. 27, 2014, titled Seismic Towing Configuration to Allow for Wide Source Separation and U.S. Provisional Patent Application Ser. No. 61/925,519, filed Jan. 9, 2014, titled Asymmetric Seismic Spread Towing for Multi-Vessel Acquisition, the disclosures of which are incorporated herein by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Seismic surveys can be conducted at sea, on shore, or in zones between sea and shore, e.g. in shallow bays, in swampy areas, and the like. A common feature of the surveys is that a seismic signal is transmitted from a seismic source and this signal is reflected by a ground formation and proceeds to be intercepted by seismic sensors. The seismic signals are then transmitted to an appropriate receiver station, where the data are processed, stored, and used for constructing structural maps of the rock formations. These maps facilitate the process of assessing the probability of the existence of oil or gas in the surveyed area.

In marine surveys, where it is the seabed that has to be surveyed, a typical seismic tow will consist of one or more sources and one or more cables, also called streamers. The actual towing is performed by one or more vessels. The seismic equipment towed behind the vessels is usually submerged in the water. A streamer generally extends to a length ranging from a few hundred meters to several thousand meters. Inside the streamer, there are located a large number of sensors, such as hydrophones and geophones. A source usually consists of several suitable sonic guns, for example, air guns, which are arranged in a row or in a group. This is also called a gun array. When air guns are used, the guns are filled with compressed air, which is then released, thereby forming the seismic pulse. This is also called a seismic shot, or a shot point. It is this pulse, which, after having been reflected, is intercepted by sensors in the seismic streamer.

SUMMARY

Described herein are implementations of various technologies for a method for acquiring seismic data. The method may include towing an array of marine seismic streamers coupled to a vessel. The array comprises a plurality of lead-in cables and streamers. The plurality of lead-in cables comprises an innermost lead-in cable and an outermost lead-in cable with respect to a center line of the vessel. The method may also include towing a plurality of source cables and one or more seismic sources such that the one or more seismic sources are positioned between the innermost lead-in cable and the outermost lead-in cable.

Described herein are also implementations of various technologies for a method for acquiring seismic data. The method may include towing a plurality of lead-in cables coupled to a vessel and streamers. The method may also include towing a plurality of source cables coupled to the vessel and seismic sources such that the seismic sources are disposed outside an outermost lead-in cable in the plurality of lead-in cables.

Described herein are also implementations of various technologies for a seismic acquisition system. The system may include a vessel. The system may include a plurality of lead-in cables coupled to the vessel and streamers. The plurality of lead-in cables comprises an innermost lead-in cable and an outermost lead-in cable with respect to a center line of the vessel. The system may also include a plurality of source cables coupled to the vessel and seismic sources. The sources are positioned between the innermost lead-in cable and the outermost lead-in cable.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Various implementations described herein will now be described in more detail with reference to FIGS. 1-4.

Figure 1:
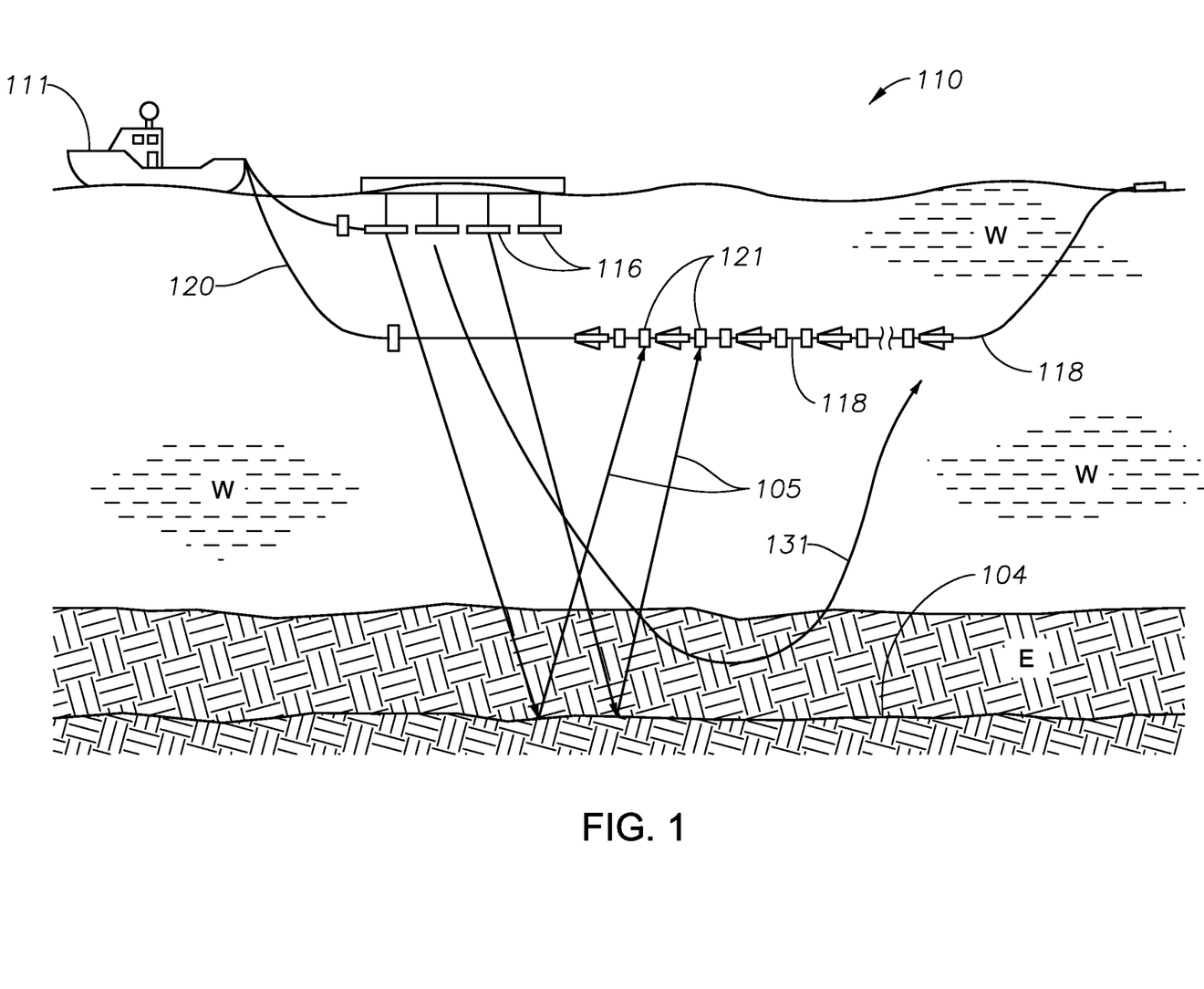
FIG. 1 illustrates a diagram of marine seismic surveying in accordance with various implementations described herein.

FIG. 1 illustrates a diagram of marine seismic surveying in accordance with various implementations described herein. A marine seismic acquisition system 110 may include a vessel 111 carrying control components and towing a plurality of seismic sources 116 and a plurality of streamers 118 equipped with seismic receivers 121. The seismic sources 116 may include a single type of source, or different types. The sources may use any type of seismic generator, such as air guns, water guns, steam injection sources, controllable seismic sources, explosive sources such as dynamite or gas injection followed by detonation and the like. The streamers 118 may be towed by means of their respective lead-ins 120, which may be made from high strength steel or fiber-reinforced cables that convey electrical power, control, and data signals between the vessel 111 and the streamers 118. An individual streamer may include a plurality of seismic receivers 121 that may be distributed at spaced intervals along the streamer's length. The seismic receivers 121 may include hydrophone and geophone sensors as well as multi-component sensor devices, such as accelerometers. Further, the streamers 118 may include a plurality of inline streamer steering devices (SSDs), also known as "birds." The SSDs may be distributed at appropriate intervals along the streamers 118 for controlling the streamers' depth and lateral movement.

During acquisition, the seismic sources 116 and the seismic streamers 118 may be deployed from the vessel 111 and towed slowly to traverse a region of interest. The seismic sources 116 may be periodically activated to emit seismic energy in the form of an acoustic or pressure wave through the water. The sources 116 may be activated individually or substantially simultaneously with other sources. The acoustic wave may result in one or more seismic wavefields that travel coherently into the earth E underlying the water W. As the wavefields strike interfaces 104 between earth formations, or strata, they may be reflected and/or refracted back through the earth E and water W along paths 105 to the various receivers 121 where the wavefields (e.g., pressure waves in the case of air gun sources) may be converted to electrical signals, digitized and transmitted to the integrated computer-based seismic navigation, source controller, and recording system in the vessel 111 via the streamers 118 and lead-ins 120. For instance, a refracting or diving wave path 131 is shown passing through the earth E and water W from the sources 116 to the seismic receivers 121. Through analysis of these detected signals, it may be possible to determine the shape, position and lithology of sub-sea formations, including those formations that may include hydrocarbon deposits.

Figure 2A:
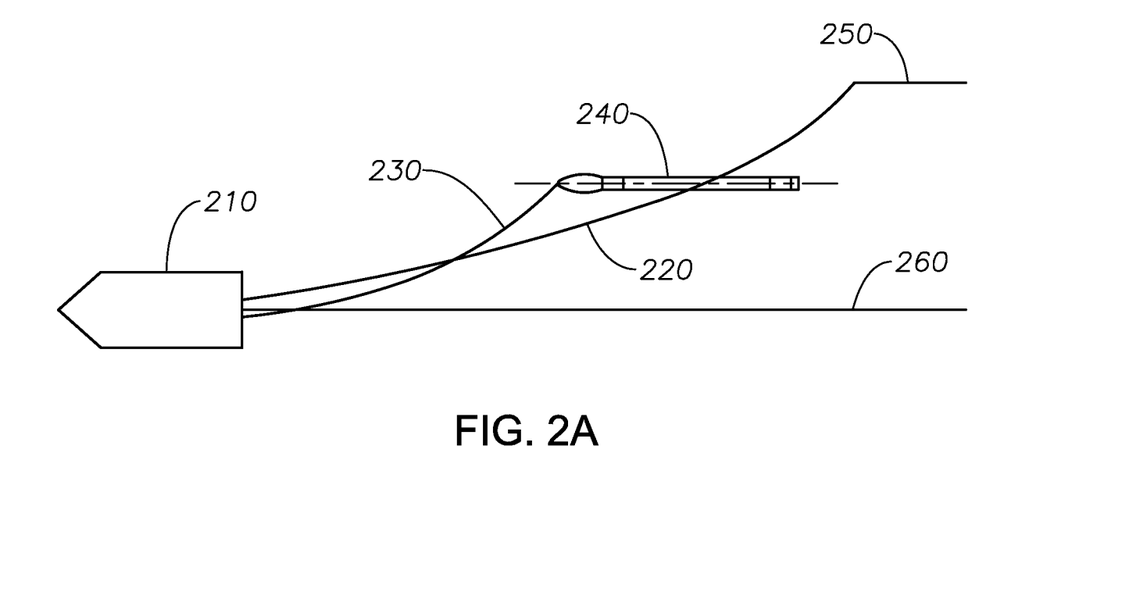
FIG. 2A illustrates a top view of a seismic surveying arrangement in accordance with implementations of various techniques described herein.

FIG. 2A illustrates a top view of a seismic surveying arrangement in accordance with implementations of various techniques described herein. For illustrative purposes, FIG. 2A only shows the right half of a streamer array, but it should be assumed that in this example the array is mirrored behind the left side of the vessel. Although the array described in FIG. 2A is a symmetric array, in one implementation, the left and right side of the array may be asymmetric. Vessel 210 is illustrated towing a lead-in 220 connected to a streamer 250. The vessel 210 is also towing a source cable 230 connected to a seismic source 240. Typically, in a marine seismic survey, sources are positioned inside of lead-ins, so that there is no interference between the sources, source cables, and lead-ins. Towing the source or sources 240 inside of the lead-ins prevents interference, but limits the distance, or offset, between the center line 260 of the streamer array and the sources 240. For example, the sources 240 in a typical survey may be 10 m to 50 m from the center line 260 of the streamer array or the center line of the vessel 210.

In FIG. 2A, the source 240 is towed over the lead-in 220, and the source cable 230 crosses over the lead-in 220. By towing the source 240 outside of the lead-in 220, the source 240 has a larger offset from the center line 260 of the array. The center line 260 may be a line that passes through the approximate center of a vessel 210 and the seismic spread being towed by the vessel during a seismic survey. For example, the source 240 offset from the center line 260 in the illustrated configuration may be 50 m to 500 m from the center line 260 of the array. Increasing the distance between the source or sources 240 and the center line 260 of the streamer array or vessel 210, or the distance between sources 240 on either side of the center line 260 of the vessel 210, may improve operational efficiency during acquisition. For example, one or more source 240 arrays may be towed at a wide offset from the center 260 of the seismic spread. In this example, the wide offset may span a distance from the center 260 of the seismic spread and include one or more receiver line intervals. A receiver line interval is the distance or separation between two adjacent streamers 250 in the array.

Figure 2B:
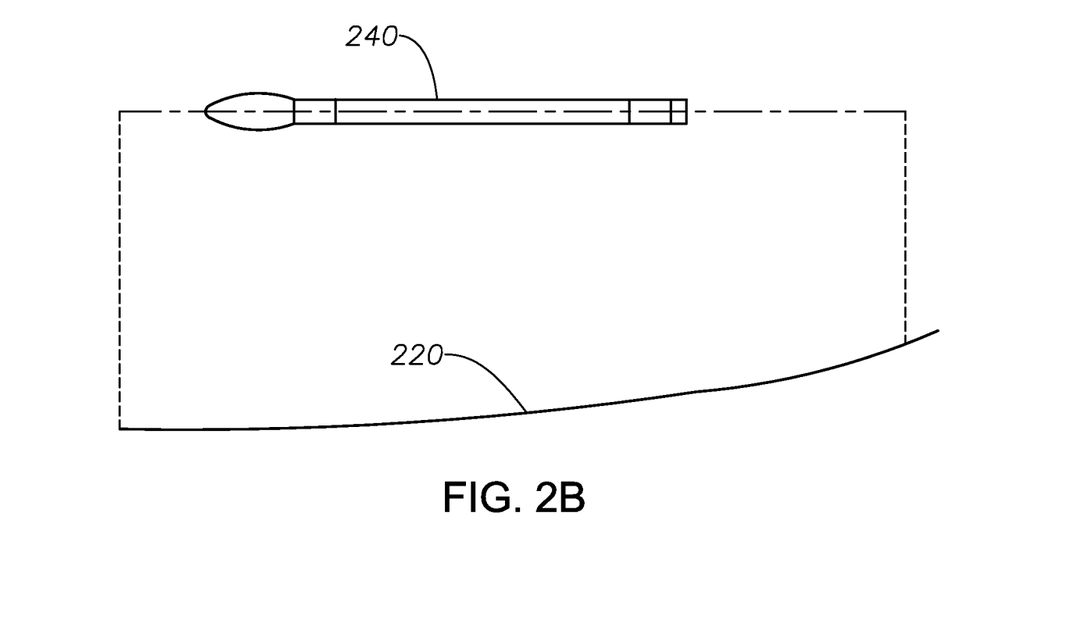
FIG. 2B illustrates a side view of a seismic surveying arrangement in accordance with implementations of various techniques described herein.

FIG. 2B illustrates a side view of a seismic surveying arrangement in accordance with implementations of various techniques described herein. As in FIG. 2A, a source 240 is being towed over a lead-in 220. The lead-in 220 has a greater depth than the source 240. Cable lengths, rope lengths, buoyancy elements, weight elements, or adjustments to the tension and orientation of cables may be used to maintain a difference in depth between the source 240 or source cable 230 and the lead-in 220. For example, the lead-in 220 may be denser than the source cable 230. The density of a cable may be increased by adding armoring to the cables. In another example, the source cable 230 may be attached to floats, or the lead-in cable 220 may be attached to weights or buoyancy elements.

Figure 3:
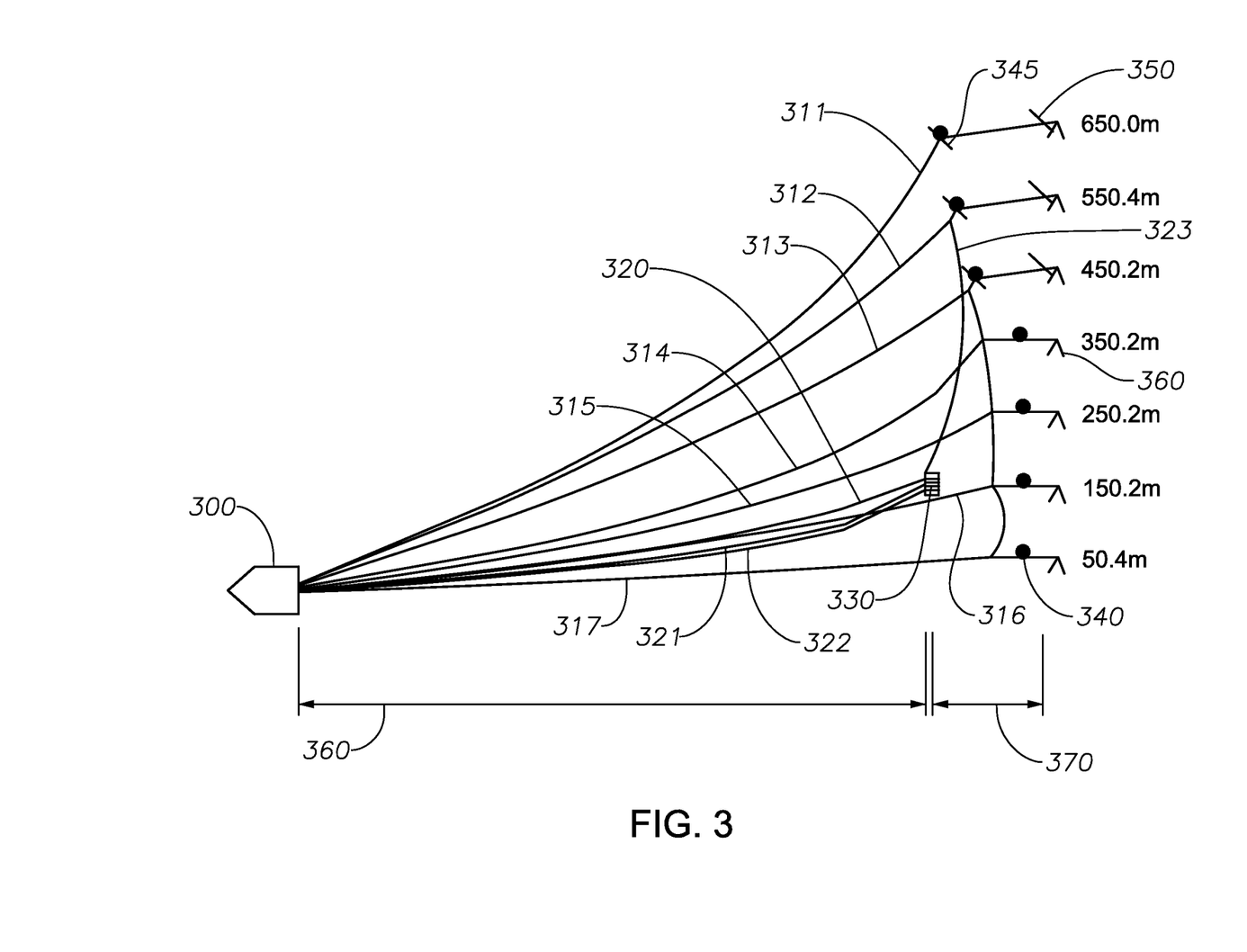
FIG. 3 illustrates a seismic surveying geometry in accordance with implementations of various techniques described herein.

FIG. 3 illustrates a seismic surveying geometry in accordance with implementations of various techniques described herein. Vessel 300 is towing lead-ins 311-17 and source cables 320-22. For illustrative purposes, FIG. 3 only shows the right half of a streamer array, but it should be assumed that the array is mirrored behind the left side of the vessel. FIG. 3 illustrates one example of a geometry for towing seismic sources inside of lead-in cables. The placement, length, amount, and position of the cables, ropes, buoyancy devices, positioning devices, and sources may be changed. For example, in order to meet a set of specifications for a seismic survey, the number of streamers may be increased or decreased, or the distance between streamers may be increased or decreased. The surveying geometry may be designed to avoid or manage interference between sources, source cables, and lead-ins during a straight tow, at speed variations, during turns, and during recovery or deployment.

The lead-ins 311-17 are attached to floats 340, illustrated as black dots. The lead-ins 311-17 may vary in length. For example, the length of the lead-ins 311-17 may range from about or approximately 500 m to about or approximately 1500 m. The lead-ins 311-13 are attached to deflectors 345. Streamers attached to the lead-ins 311-13 are also attached to deflectors 350. Deflectors 345 and 350 may be used to control the distance between streamers. For example, in FIG. 3, the deflectors are configured to position the streamers approximately 100 m apart.

The length of the streamer between the end of the lead-ins 311-17 and a marker 360 is the inactive portion of the streamer 311-17. The marker 360 is for illustrative purposes only. The inactive portion of the streamer 311-17 is a section of cable without any receivers.

The offset from the center line of the vessel is shown in the Figure for each streamer 311-17, and ranges from an offset of about or approximately 50 m for streamer 317 to about or approximately 650 m for streamer 311. Assuming the streamer array is mirrored on the left side of the vessel, the total survey spread of the illustrated array is approximately 1300 m, with a streamer separation of approximately 100 m.

Sources 330 and source cables 320-22 are towed between the innermost lead-in 317 and the outermost lead-in 311. The inner lead-ins 315-17 may be towed at a greater depth than the outer lead-ins 311-14, so that the sources 330 do not interfere with the inner lead-ins 315-17. For example, the sources 330 may be able to freely cross above lead-in cables without tangling or producing interference with each other. Any contact between the sources 330 or source cables 320-22 and lead-ins 311-17 could lead to tangling, damage to sources 330, or other issues that could delay a seismic survey. In one implementation, outer lead-ins 311-14 may be lightweight cables, and inner lead-ins 315-17 may be heavier, or denser, cables. In another implementation, weights may be attached to the inner lead-ins 315-17 to increase the depth of the cables.

To determine acquisition system parameters, such as lead-in cable 311-17 lengths, source cable 320-22 lengths, rope lengths, cable tensions, cable orientations, cable buoyancy, and types and/or locations of buoyancy elements (e.g., birds, deflectors, etc.), one or more towing simulations may be generated for a particular seismic survey. As such, the towing simulations may be used to prevent or manage interference or tangling between sources 330, source cables 320-22 and lead-in cables 311-17 during the particular seismic survey. Using simulation tools, the behavior of source 330 arrays, source cables 320-22 and lead-ins 311-17 may be predicted in the towing simulations for a seismic survey that includes a straight tow, turns, speed variations and/or severe environmental conditions. The towing simulations may also be used in the recovery or deployment of various spread components (e.g., sources or birds) for the seismic survey.

Heavier cables used for inner lead-ins 315-17 may be about or approximately two to ten times as dense as lightweight cables used for outer lead-ins 311-14. For example, the density of heavier lead-ins 315-17 may be approximately 2600 kg/m$^3$ and the density of the lighter lead-ins 311-14 may be approximately 1200 kg/m$^3$.

The sources 330 are at an offset of approximately 150 m from the center line of the array. In FIG. 3, three sources 330 are shown, but the number of sources 330 may vary, and the distance of each source from the center line of the array may vary. The source cables 320-22 attached to the sources 330 may be separated by a distance. For example, the source cables may be separated by 5 m to 20 m.

In one implementation, a distance rope 323, or multiple distance ropes 323, connects the sources 330 to the lead-in 312, or to the deflector 345 on the lead-in 312. The distance rope 323 may be attached to multiple lead-ins 311-17, multiple deflectors 345, multiple floats 340, or combinations thereof. In another implementation, the distance rope 323 may travel from the sources 330, to the lead-in 312, and then to a winch on the vessel 300. In this implementation, the sources 330 may be repositioned by altering the distance rope 323 length using the winch on the vessel 300. An example of controlling source location using winches is described in commonly assigned U.S. Pat. No. 7,881,152. In yet another implementation, one or more deflectors or other steering devices may be attached to the source cables 320-22, and used to control the position of the sources 330.

Distance 360 illustrates the distance from the vessel 300 to the sources 330. Distance 370 illustrates the distance, which may be referred to as an offset, between the sources 330 and the beginning of the active portion of the streamers 311-17. Data quality may be improved by reducing the distance 370 between the sources 330 and receivers.

Figure 4:
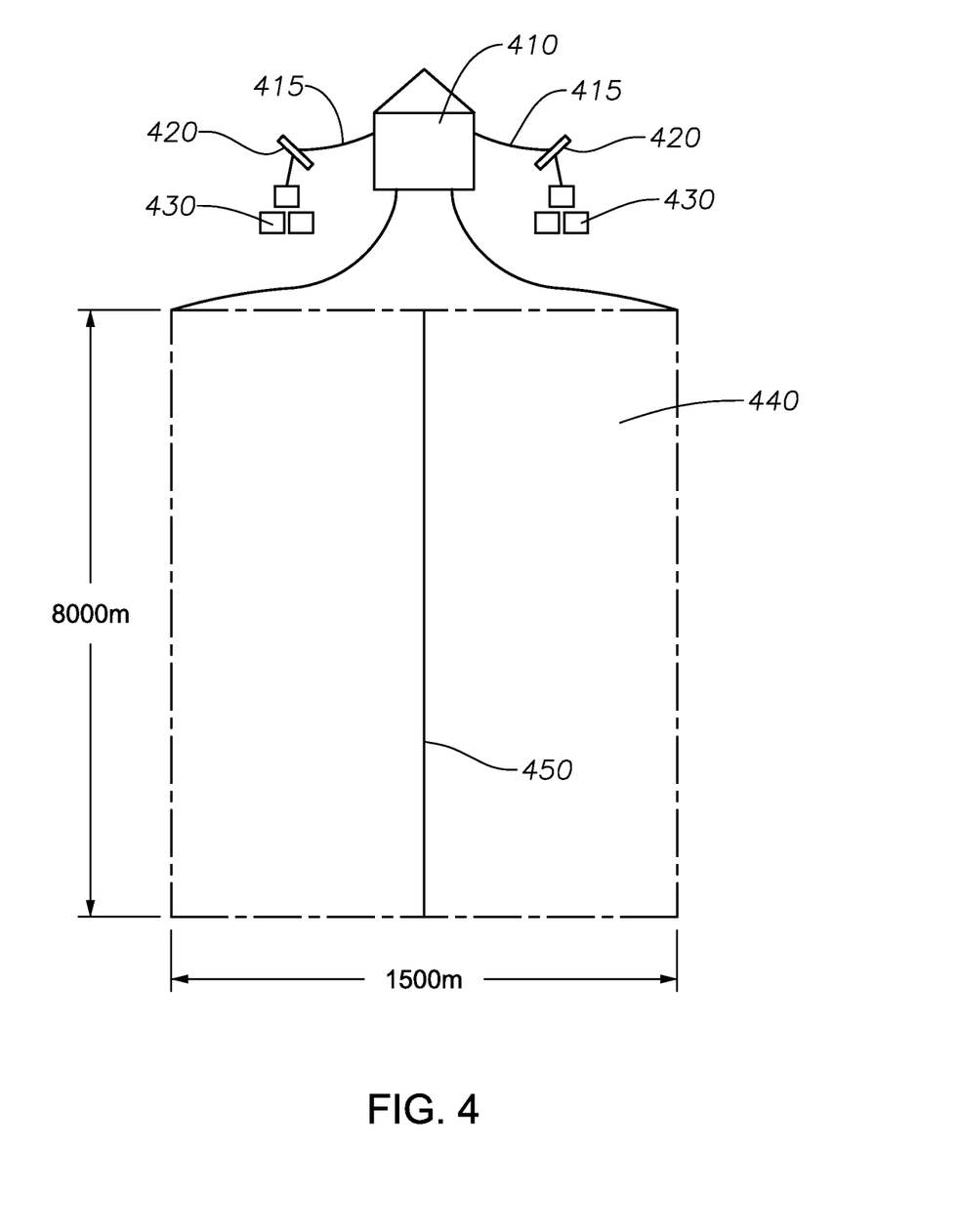
FIG. 4 illustrates a seismic surveying geometry with source cable deflectors in accordance with implementations of various techniques described herein.

FIG. 4 illustrates a seismic surveying geometry with source cable deflectors in accordance with implementations of various techniques described herein. A vessel 410 is towing a seismic array 440. The seismic array 440 includes seismic streamers. In this illustration, the length of the seismic array 440 is about or approximately 8000 m and the width is about or approximately 1500 m, but the width and length of the seismic array 440 may be altered depending on the survey specifications. For example, a seismic spread may have a width of 2400 m and a length of 15 km.

Source cables 415 are attached to the side of the vessel 410. In certain implementations, the source cables 415 may be attached to the rear of the vessel 410. Deflectors 420 may also be attached to the source cables 415. The deflectors 420 are used to control the position of sources 430, which are also attached to the source cables 415. In this manner, the sources 430 are positioned outside of the streamers and lead-ins that comprise the streamer array 440. The sources 430 are positioned outside of the outermost lead-in in the streamer array 440. In this configuration, the sources may be between about or approximately 50 m and about or approximately 1000 m from the center line 450 of the array 440 or the vessel 410.

The sources 430 used in FIG. 4 may be sources in which the distance between sources and receivers has a lower effect on data quality than with airguns. For example, the sources 430 may be vibrating sources.

The detailed description is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

Reference has been made in detail to various implementations, examples of which are illustrated in the accompanying drawings and figures. In the detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for acquiring seismic data, comprising:
   towing an array of marine seismic streamers coupled to a vessel, wherein the array comprises a plurality of lead-in cables and streamers, and the plurality of lead-in cables comprises an innermost lead-in cable and an outermost lead-in cable with respect to a center line of the vessel, and wherein each of the plurality of lead-in cables is towed at an offset to the center line of the vessel; and
   towing a plurality of source cables and one or more seismic sources such that the one or more seismic sources are positioned entirely between the innermost lead-in cable and the outermost lead-in cable, wherein the plurality of source cables are configured to cross over at least one of the plurality of lead-in cables, wherein the at least one of the plurality of the lead-in cables is disposed at a greater depth than the source cables or seismic sources and wherein the seismic sources are disposed between 50 and 500 meters apart from the center line of the vessel.

2. The method of claim 1, wherein the innermost lead-in cable is disposed at a greater depth than the source cables or seismic sources.

3. The method of claim 1, wherein the innermost lead-in cable has a greater density than the source cables.

4. The method of claim 1, wherein at least one of the plurality of the lead-in cables has a greater density than the source cables.

5. The method of claim 1, further comprising towing at least one of the source cables over at least one of the lead-in cables.

6. The method of claim 1, wherein the innermost lead-in cable has a greater density than the outermost lead-in cable.

7. The method of claim 1, wherein at least one of the plurality of the lead-in cables has a greater density than the outermost lead-in cable.

8. The method of claim 1, further comprising pulling at least one of the seismic sources from the center line of the vessel using one or more ropes connecting at least one of the seismic sources or source cables to one of the lead-in cables or a deflector.

9. A method for acquiring seismic data, comprising:
   towing a plurality of lead-in cables coupled to a vessel and streamers, wherein each of the plurality of lead-in cables is towed at an offset to the center line of the vessel; and
   towing a plurality of source cables and seismic sources coupled to the same vessel such that the seismic sources are disposed outside an outermost lead-in cable in the plurality of lead-in cables, wherein the plurality of source cables are configured to cross over at least one of the plurality of lead-in cables, wherein the at least one of the plurality of the lead-in cables is disposed at a greater depth than the source cables or seismic sources and wherein the seismic sources are between 50 and 1000 meters apart from a center line of the vessel.

10. The method of claim 9, wherein the source cables are coupled to a left or right side of the vessel.

11. The method of claim 9, wherein the seismic sources are vibrating sources.

12. The method of claim 9, wherein deflectors are attached to the source cables.

13. A seismic acquisition system, comprising:
    a vessel;
    a plurality of lead-in cables coupled to the vessel and streamers, wherein the plurality of lead-in cables comprises an innermost lead-in cable and an outermost lead-in cable with respect to a center line of the vessel, and wherein each of the plurality of lead-in cables is towed at an offset to the center line of the vessel;
    a plurality of source cables coupled to the vessel and seismic sources; and
    wherein the sources are positioned entirely between the innermost lead-in cable and the outermost lead-in cable, wherein the plurality of source cables are configured to cross over at least one of the plurality of lead-in cables, wherein the at least one of the plurality of the lead-in cables is disposed at a greater depth than the source cables or seismic sources and wherein the seismic sources are offset by a distance of between 50 and 200 meters from the center line of the vessel.

14. The seismic acquisition system of claim 13, wherein the innermost lead-in cable is disposed at a greater depth than the source cables or seismic sources.

15. The seismic acquisition system of claim 13, wherein at least one of the source cables crosses over at least one of the lead-in cables.

16. The seismic acquisition system of claim 13, further comprising one or more ropes connecting at least one of the seismic sources or source cables to one of the lead-in cables or a deflector.

17. The seismic acquisition system of claim 13, wherein the innermost lead-in cable has a greater density than the source cables.

18. The seismic acquisition system of claim 13, wherein at least one of the plurality of the lead-in cables has a greater density than the source cables.

19. The seismic acquisition system of claim 13, wherein the innermost lead-in cable has a greater density than the outermost lead-in cable.

20. The seismic acquisition system of claim 13, wherein at least one of the plurality of lead-in cables has a greater density than the outermost lead-in cable.

21. The seismic acquisition system of claim 13, wherein one or more floats are attached to one or more of the source cables or one or more weights are attached to one or more of the lead-in cables.

* * * * *